(12) United States Patent
Stone

(10) Patent No.: US 7,102,567 B2
(45) Date of Patent: Sep. 5, 2006

(54) SYSTEM AND METHOD FOR ESTIMATING CLOCK ACCELERATION AND LOCATION DETERMINATION

(75) Inventor: Jesse Stone, Palo Alto, CA (US)

(73) Assignee: SiRF Technology, Inc., San Jose, CA (US)

( * ) Notice: Subject to any disclaimer, the term of this patent is extended or adjusted under 35 U.S.C. 154(b) by 195 days.

(21) Appl. No.: 10/696,892

(22) Filed: Oct. 29, 2003

(65) Prior Publication Data

US 2005/0093740 A1 May 5, 2005

(51) Int. Cl.
*G01S 5/14* (2006.01)
(52) U.S. Cl. .................................. 342/357.15
(58) Field of Classification Search ............ 342/357.15
See application file for complete search history.

(56) References Cited

U.S. PATENT DOCUMENTS

| | | | |
|---|---|---|---|
| 5,809,064 A | 9/1998 | Fenton et al. | 375/150 |
| 5,969,672 A | 10/1999 | Brenner | 342/357.06 |
| 6,397,146 B1 | 5/2002 | Bruner | 701/213 |
| 2002/0105458 A1 | 8/2002 | Dooley et al. | 342/357.05 |
| 2005/0162306 A1* | 7/2005 | Babitch et al. | 342/357.05 |

* cited by examiner

*Primary Examiner*—Gregory C. Issing
(74) *Attorney, Agent, or Firm*—Edward C. Kwok; MacPherson Kwok Chen & Heid LLP

(57) ABSTRACT

A method and a system for a location determination (a) acquire a first positioning signal; (b) analyze the first positioning signal to provide an estimate of a clock signal acceleration; (c) acquire additional positioning signals based on the estimate of the clock signal acceleration; and (d) perform the location determination using the first positioning signal and the additional positioning signals. The additional positioning signals may be acquired using a stacking technique. The first positioning signal may be acquired based on a signal-to-noise ratio exceeding a predetermined threshold. Clock signal acceleration may be estimated using a constant clock signal acceleration parametric model, which may be parabolic model based on a function that depends on the clock signal acceleration, a clock Doppler and an initial phase value. Alternatively, grids of various granularity may be searched clock signal acceleration space and a clock Doppler space in the vicinity of a clock Doppler value measured in the acquisition of the first positioning signal.

20 Claims, 4 Drawing Sheets

Method for estimating clock acceleration

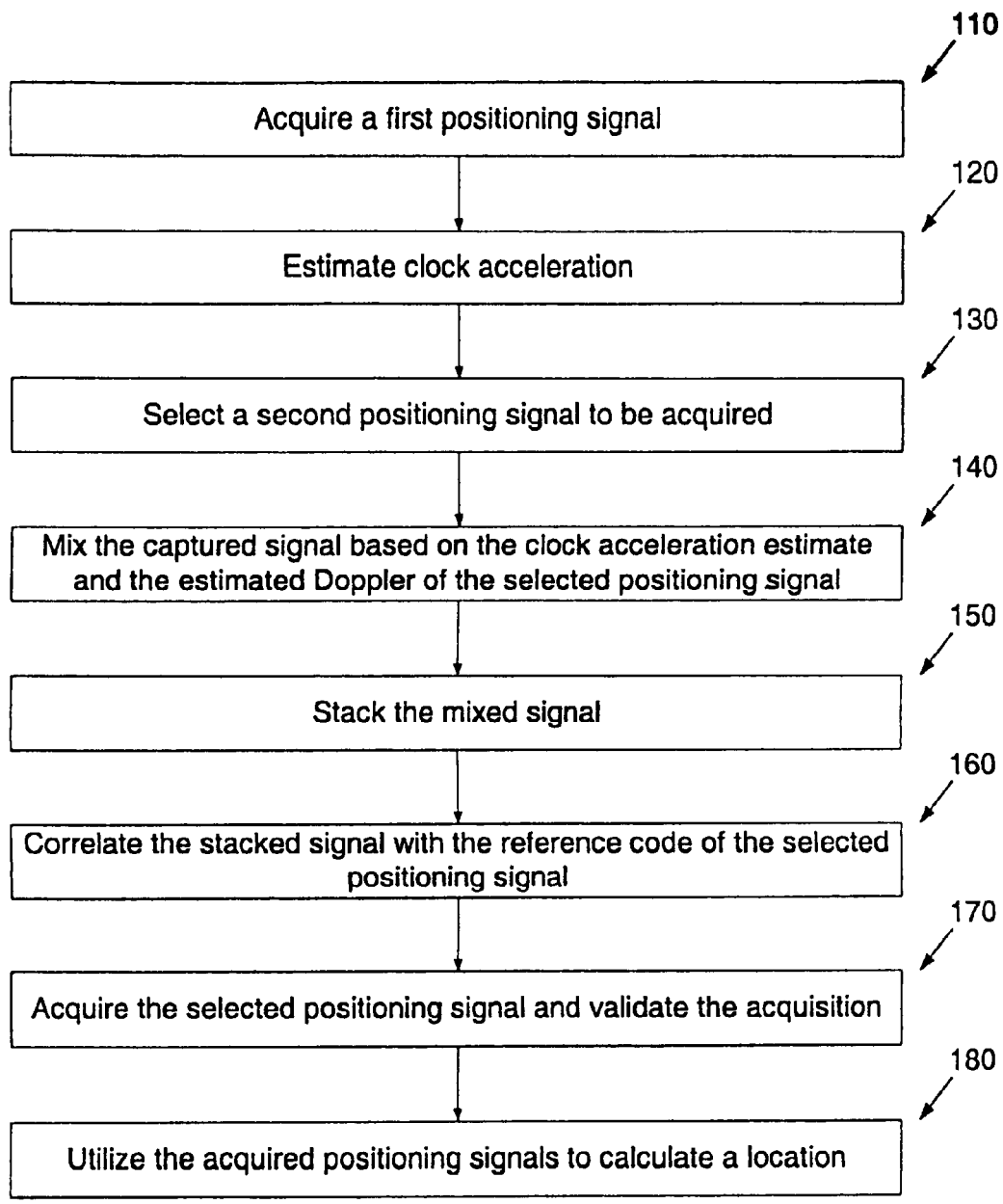
Fig. 1. Method for acquiring positioning signals and calculating a location

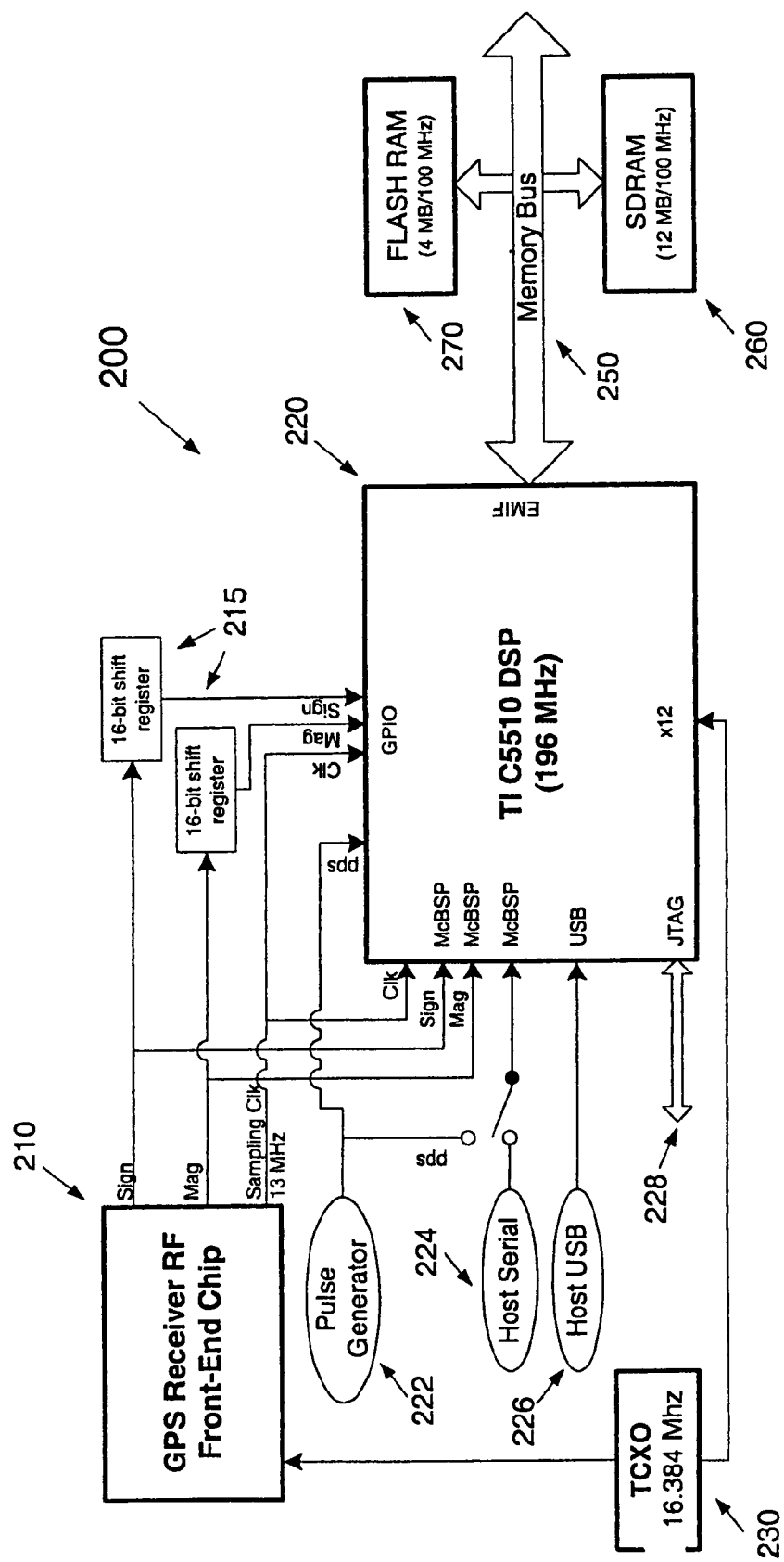
Fig. 2. Apparatus to estimate clock acceleration and calculate position information

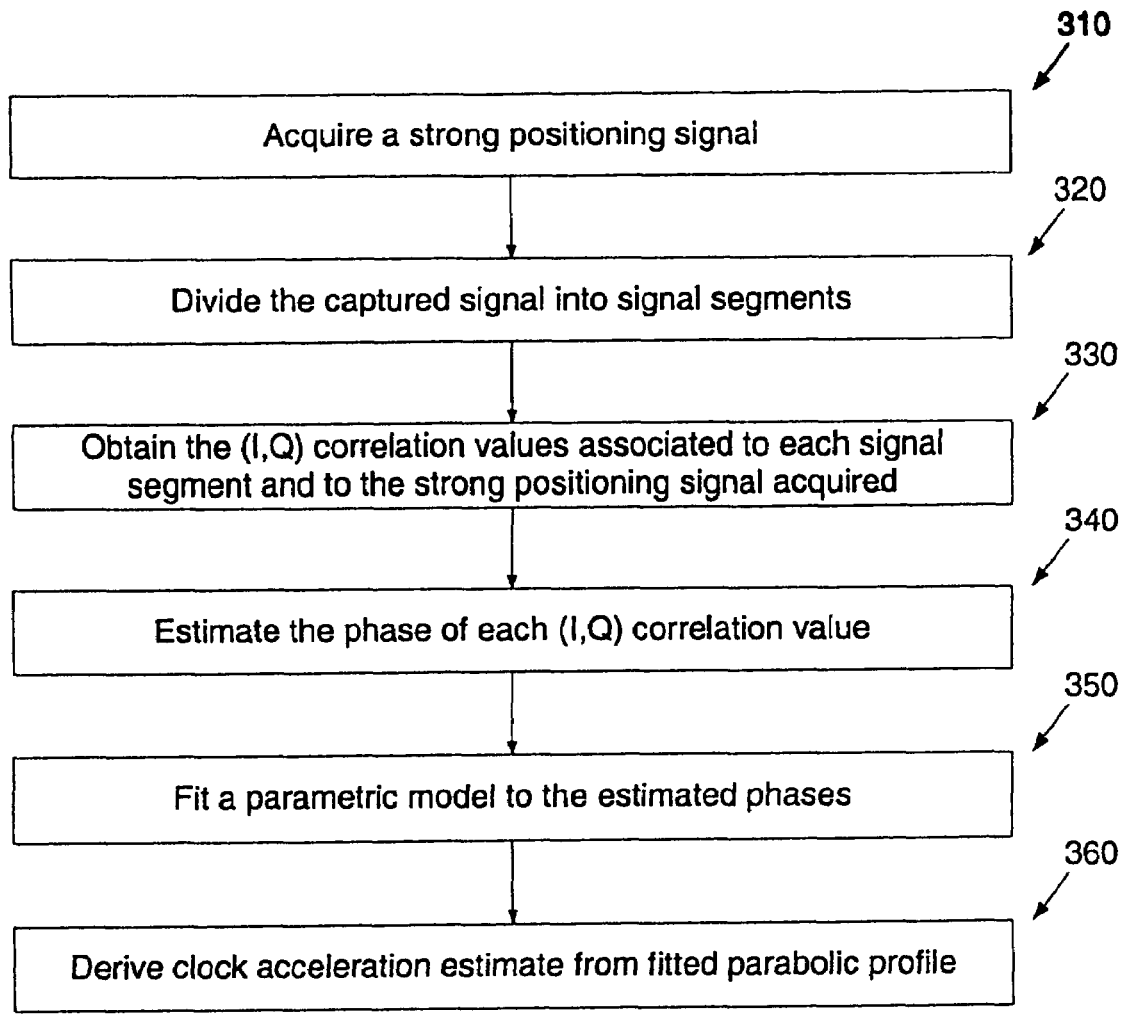
Fig. 3. Method for estimating clock acceleration

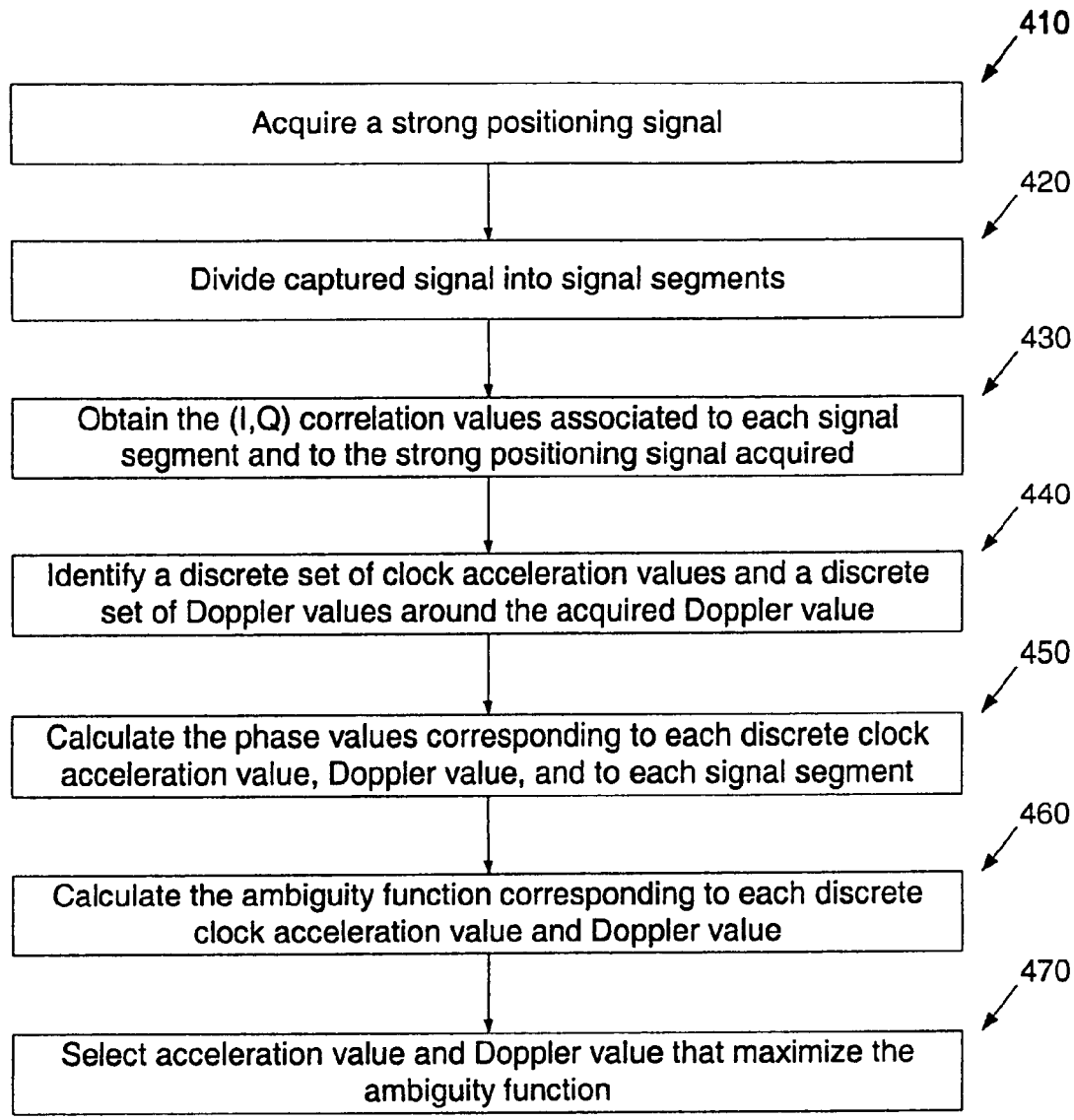
Fig. 4. Method for estimating clock acceleration

SYSTEM AND METHOD FOR ESTIMATING CLOCK ACCELERATION AND LOCATION DETERMINATION

BACKGROUND OF THE INVENTION

1. Field of the Invention

This invention relates to a system and a method for processing positioning signals to estimate an acceleration of an embedded timing signal, so as to improve the performance of a positioning function.

2. Discussion of the Related Art

Changes in frequency can reduce the signal-to-noise ratio in a measured positioning signal, typically acquired by calculating a correlation between the positioning signal and a locally generated replica. This reduction in signal-to-noise ratio is particularly relevant in a system in which a coherent correlation is calculated over a long time period. Hence, there is a need for a method and a system to estimate the variations of the clock's frequency. In addition, there is a need for a method and a system that uses these estimated variations to improve processing of the positioning signals.

The following co-pending U.S. patent applications ("Copending Patent Applications") assigned to the Assignee of the present patent application disclose relevant signal processing techniques:

1. Signal Acquisition using Data Bit Information, Ser. No. 09/888,228, filed Jun. 22, 2001, now U.S. Pat. No. 6,512,479, issued Jan. 28, 2003 (hereafter, "Application 228");
2. Synthesizing Coherent Correlation Sums at One or Multiple Carrier Frequencies Using Correlation Sums Calculated at a Coarse Set of Frequencies, Ser. No. 09/888,227, filed Jun. 22, 2001 (hereafter, "Application 227");
3. Extracting Fine-Tuned Estimates from Correlation Functions Evaluated at Limited Number of Values, Ser. No. 09/888,338, filed Jun. 22, 2001, (hereafter, "Application 338");
4. Determining the Spatio-Temporal and Kinematic Parameters of a Signal Receiver and its Clock by Information Fusion, Ser. No. 09/888,229, filed Jun. 22, 2001 now U.S. Pat. No. 6,542,116, issued Apr. 1, 2003 (hereafter, "Application 229");
5. Determining Location Information Using Sampled Data Containing Location-Determining Signals And Noise, Ser. No. 09/888,337, filed Jun. 22, 2001, now U.S. Pat. No. 6,535,163, issued Mar. 18, 2003 (hereafter, "Application 337");
6. System and method to estimate the location of a receiver in a multi-path environment, Ser. No. 10/237,556, filed on Sep. 6, 2002 (hereafter, "Application 556"); and
7. System and method estimate the location of a receiver, Ser. No. 10/237,557, filed on Sep. 6, 2002 (hereafter, "Application 557").

The Copending Patent Applications are hereby incorporated by reference in their entireties.

SUMMARY OF THE INVENTION

The present invention provides a method and a system for a location determination based on estimating a clock signal acceleration. According to one embodiment of the present invention, the method includes (a) acquiring a first positioning signal; (b) analyzing the first positioning signal to provide an estimate of a clock signal acceleration; (c) acquiring additional positioning signals based on the estimate of the clock signal acceleration; and (d) performing the location determination using the first positioning signal and the additional positioning signals. In one embodiment of the present invention, the additional positioning signals are acquired using a stacking technique. The first positioning signal may be acquired based on a signal-to-noise ratio exceeding a predetermined threshold.

According to one embodiment, the clock signal acceleration may be estimated by (a) dividing the first positioning signal into a predetermined number of segments; (b) estimating a phase value for a time point in each of the segments; (c) fitting the phase values into a parametric model that depends on the phase values and the clock signal acceleration; and (d) deriving the clock signal from the parametric model. Such a parametric model, for example, may be based on a constant clock signal acceleration. The parametric model may be based on a parabolic function having variables: the clock signal acceleration, an initial phase value and a clock Doppler. In that embodiment, each phase value of the segments may be estimated using a quadrature correlation function based on phase values previously estimated.

According to a second embodiment of the present invention, the clock signal acceleration may be estimated by (a) selecting a set of test clock acceleration values and a set of test clock doppler values based on a clock Doppler estimated from the acquired first positioning signal; and (b) choosing one of the test clock acceleration values as the estimate of the clock signal acceleration based on evaluating an ambiguity function using the test clock acceleration values and the test clock Doppler values. The ambiguity function may be based on the magnitude of a complex quadrature phase correlation function. In one embodiment, the test clock acceleration values and the test clock Doppler values are selected based on a coarse grid and a finer grid of the clock acceleration values and the clock Doppler values.

The present invention is better understood upon consideration of the detailed description below and accompanying drawings.

BRIEF DESCRIPTION OF THE DRAWINGS

FIG. 1 is a flow chart illustrating a method for acquiring a positioning signal, such as a GPS signal, estimating a clock acceleration and, using the acquired signal and the clock acceleration, to determining a location, in accordance with one embodiment of the present invention.

FIG. 2 shows device 200 which is an exemplary circuit suitable for use to carry out acquisitions of GPS positioning signals and the location determination described above in conjunction with FIG. 1.

FIG. 3 show flow chart 300, which illustrates a first method for estimating a clock acceleration, according to one embodiment of the present invention.

FIG. 4 show flow chart 400, which illustrates a second method for estimating a clock acceleration, according to a second embodiment of the present invention.

DETAILED DESCRIPTION OF THE PREFERRED EMBODIMENTS

FIG. 1 is a flow chart illustrating a method for acquiring a positioning signal, such as a GPS signal, estimating a clock acceleration and, using the acquired signal and the clock acceleration, to determining a location, in accordance with one embodiment of the present invention. Clock acceleration is a measure of a clock frequency variation occurring while the positioning signal is being captured. The Clock frequency variation is often referred to as a "clock doppler." The Copending Patent Applications (e.g., Application 557) provide some examples of ways to perform some of the steps of FIG. 1.

As shown in FIG. 1, at step 110, a first positioning signal is acquired in any manner without using a clock acceleration estimate. The signal-to-noise (SNR) ratio of this first positioning signal is preferably sufficiently high for reliable acquisition, despite the unknown clock acceleration. At step 120, a clock acceleration value is estimated, in accordance with one embodiment of the present invention. Such a clock acceleration estimate is illustrated in this detailed description by two techniques described in further detail below. At step 130, a second positioning signal is selected as a target for acquisition. At step 140, this second positioning signal to be acquired is mixed with a carrier phase term containing a known Doppler shift associated with the selected positioning signal, and a varying Doppler shift based on the estimated clock acceleration obtained previously at step 120.

At step 150, if desired, the mixed signal of step 140 may be stacked. At step 160, the mixed signal is correlated with a reference code associated with the selected positioning signal using, for example, a correlation function disclosed in a method described in the Application 557. At step 170, the correlation function is compared with a threshold value. A signal acquisition is obtained when the correlation function exceeds the threshold value, and after one or more validation tests are satisfied. Steps 130–170 may be repeated for several positioning signals, until sufficient information for location determination is obtained, or until all available signal sources have been evaluated. Finally, at step 180, information obtained from all the validated acquisitions (e.g., the code-phases of the acquired positioning signals) may be used in any suitable manner to obtain a location determination.

FIG. 2 shows device 200, which is an exemplary circuit illustrating acquisitions of GPS positioning signals and the location determination described above in conjunction with FIG. 1. As shown in FIG. 2, device 200 includes GPS receiver front-end circuit 210, which receives a GPS signal via an antenna (not shown). In GPS receiver front-end circuit 210, the received GPS signal is amplified, filtered, and down-converted to an intermediate frequency. Next, the intermediate signal is then sampled and quantized down to two bits (e.g., a sign bit and a magnitude bit) at each sampling time point. Conventional GPS receiver front-end circuits, such as GPS receiver front-end circuit 210, are known to those skilled in the art. Each bit of the 2-bit signal samples may be serially shifted into a corresponding one of registers 215 to be accumulated as two 16-bit words to allow processor 220. Processor 220 may write these 16-bit words into a word-addressable memory SDRAM 260[1] via

[1] SDRAM stands for "synchronous dynamic random access memory." In this description, SDRAM 260 provides a memory system used during program execution. The use of SDRAM integrated circuits to implement is merely exemplary. SDRAM 260 can be implemented by any one of many memory technologies. memory bus 250. In this embodiment, both GPS receiver front-end 210 and processor 220 receive a clock signal from oscillator 230. Pulse generator 222 transmits a timing signal to processor 220 so as to synchronize device 200 with a host device (not shown). In one embodiment, the host device may be a mobile communication terminal, such as a wireless phone. The host device, in turn, may receive timing information from a network to which it is connected.

In device 200 of FIG. 2, host serial interface 224 handles all communication between processor 220 and the host device, including, for example, transmitting from the host GPS signal acquisition aiding data to processor 220, and transmitting positioning information back to the host device. Host USB interface 226 and JTAG interface 228 may be provided for debugging purposes. Processor 220 processes positioning signals by executing instructions of a program stored in Flash RAM 270[2]. Flash RAM 270 also provides non-volatile storage for reference signals. The instructions of the program and the reference signals in Flash RAM 270 are loaded into SDRAM memory 260 during operation. Memory SDRAM 260 is also used to store intermediate calculations of the processor 120, such as the grid correlation values described in App. 557.

[2] Flash RAM stands for "flash random access memory." "Flash" refers to a type of non-volatile memory device that is electrically programmable and erasable. The use of Flash RAM integrated circuits in Flash RAM 270 is merely exemplary. Flash RAM 270 can be implemented by any of a number of different non-volatile memory integrated circuits.

FIG. 3 shows flow chart 300, which illustrates a first method for estimating a clock acceleration value, in accordance with one embodiment of the present invention. At step 310, a first positioning signal is acquired without using a clock acceleration estimate. The signal-to-noise (SNR) ratio of this first positioning signal is preferably sufficiently high to allow a reliable acquisition, despite the possible presence of an unknown clock acceleration. At step 320, the acquired signal is divided into n signal segments. For example, in one embodiment, a GPS signal of duration 1024 ms is divided into n=8 segments. Next, at step 330, the IQ correlation (i.e., quadrature) values associated with each signal segment of the positioning signal acquired at step 310 are calculated. These IQ correlation values each can be used to estimate a doppler frequency and a code-phase. If the acquired positioning signal is, for example, divided into 8 segments then step 330 generates 8 pairs of IQ correlation values. At step 340, phase $\phi_i$ of each segment is derived from the corresponding IQ correlation value:

$$\phi_i = \frac{a \tan 2(Q_i, I_i)}{2\pi}$$

This detailed description uses the convention that phase $\phi_i$ is associated with the time at the midpoint of each segment, denoted $t_i$ (in seconds). As shown in the above equation, the phase value is expressed in units of cycles, rather than radians, due to the divisor $2\pi$. Consequently, with time expressed in seconds, and phase expressed in cycles, the resulting estimated clock acceleration is expressed Hz per second.

At step 350, a parametric model is fitted to obtain the predicted phases $\phi_i$. In one embodiment, by assuming a constant clock acceleration, a quadratic parametric model is used. Fitting to a quadratic parametric model can be carried out in two steps. First, the code phases are "unwrapped." This step is performed to resolve the ambiguity in the calculated phase of step 340. Unwrapping may be accomplished by the following procedure (for each segment, the phase ambiguity is determined based on all previous segments).

1. For the first segment, the unwrapped phase is accepted as the phase calculated above;
2. For the second segment, the unwrapped phase is required to be within one-half cycle of the first segment. To obtain the unwrapped phase, an integer number of cycles are added to or subtracted from calculated phase;

3. For the third segment, a straight line fit using the first two segments is used to predict the phase of the third segment. The unwrapped phase of the third segment is also required to be within ½ cycle of the predicted phase; thus, the predicted phase is given by:

$$\frac{\phi_3 - \phi_2}{t_3 - t_2} = \frac{\phi_2 - \phi_1}{t_2 - t_1} \text{ or } \phi_3 = (\phi_2 - \phi_1)\frac{t_3 - t_2}{t_2 - t_1} + \phi_2$$

4. For the fourth and successively higher segments, the unwrapped phase is obtained using unwrapped phases of three previously processed segments. To illustrate, let $t_4$ be the time of the segment (i.e., the time at the midpoint of the segment) which phase is predicted, $t_3$ be the time of the segment immediately preceding, $t_1$ be the time of the first segment, and $t_2$ be the time segment halfway between $t_1$ and $t_3$. Such a selection results in a choice of $t_1$, $t_2$ and $t_3$ spaced apart the maximum amount of time. The predicted phase $\phi_4$ satisfies the following (parabolic) equation:

$$\frac{\frac{\phi_3-\phi_2}{t_3-t_2} - \frac{\phi_2-\phi_1}{t_2-t_1}}{\frac{t_3-t_1}{2}} = \frac{\frac{\phi_4-\phi_3}{t_4-t_3} - \frac{\phi_3-\phi_2}{t_3-t_2}}{\frac{t_4-t_2}{2}}$$

so that $\phi_4$ is given by:

$$\phi_4 = \left[\left(\frac{\phi_3-\phi_2}{t_3-t_2} - \frac{\phi_2-\phi_1}{t_2-t_1}\right)\frac{t_4-t_2}{t_3-t_1} + \frac{\phi_3-\phi_2}{t_3-t_2}\right](t_4-t_3) + \phi_3$$

The unwrapped phase is required to be ½ cycle of the predicted phase.

After code phases unwrapped, as described above, a parabolic fit is performed on all the unwrapped phases. To perform the parabolic fit, the following model phase model is adopted:

$$\phi(t) = \frac{1}{2}at^2 + ft + \phi_0$$

a, f, $\phi_0$ are the unknown acceleration, Doppler and carrier phase parameters to be determined using the unwrapped code phases. In one embodiment, the parameter values are obtained by minimizing the sum of squares of the differences between the unwrapped phases and the phases predicted by the model. In other words, by minimizing:

$$S(a, f, \phi_0) = \sum_i \left(\frac{1}{2}at_i^2 + ft_i + \phi_0 - \phi_i\right)^2$$

Minimization can be accomplished by setting to zero the derivatives of $S(a, f, \phi_0)$ with respect to a, f and $\phi_0$, respectively:

$$\sum_i \left(\frac{1}{2}at_i^2 + ft_i + \phi_0 - \phi_i\right)t_i^2 = 0$$

$$\sum_i \left(\frac{1}{2}at_i^2 + ft_i + \phi_0 - \phi_i\right)t_i = 0$$

$$\sum_i \left(\frac{1}{2}at_i^2 + ft_i + \phi_0 - \phi_i\right) = 0$$

To simplify presentation, we define $$T_m = \sum_i t_i^m \text{ and } P_m = \sum_i \phi_i t_i^m.$$

Rewriting the above equations using $T_m$ and $P_m$ to obtain:

$$\frac{1}{2}aT_4 + fT_3 + \phi_0 T_2 = P_2$$

$$\frac{1}{2}aT_3 + fT_2 + \phi_0 T_1 = P_1$$

$$\frac{1}{2}aT_2 + fT_1 + \phi_0 n = P_0$$

where n is the number of segments. Solving these equations for a, f, $\phi_0$, one obtains:

$$\phi_0 = \frac{(T_4 T_2 - T_3 T_3)(P_0 T_4 - P_2 T_2) - (T_4 T_1 - T_2 T_3)(P_1 T_4 - P_2 T_3)}{(T_4 T_2 - T_3 T_3)(T_4 n - T_2 T_2) - (T_4 T_1 - T_2 T_3)(T_4 T_1 - P_3 T_2)}$$

$$f = \frac{P_1 T_4 - P_2 T_3 - \phi_0 (T_4 T_1 - T_3 T_2)}{(T_4 T_1 - T_3 T_3)}$$

$$a = \frac{2}{T_4}(P_2 - fT_3 - \phi_0 T_2)$$

The acceleration value a and Doppler value f can then be used for signal acquisition step 140 of FIG. 1.

FIG. 4 show flow chart 400, which illustrates a second method for estimating a clock acceleration value, according to a second embodiment of the present invention. Steps 410, 420 and 430 are substantially similar to steps 310, 320 and 330, described above. Specifically, at step 410, a first positioning signal is acquired without using a clock acceleration estimate. The acquired signal preferably has a signal-to-noise (SNR) ratio sufficiently high to allow a reliable acquisition, despite the unknown clock acceleration. At step 420, the acquired signal is divided into n signal segments. For example, in one embodiment, a GPS signal of duration 1024 ms is divided into 8 segments. Next, at step 430, the method obtains in-phase correlation (I) and quadrature phase correlation (Q) values associated with each segment of the positioning signal acquired at step 410.

At step 440, scanning across acceleration space and the Doppler space for a set of values for acceleration a and a set of values for doppler f in the vicinity of the measured Doppler f of the positioning signal acquired at step 410.

Then, at step 450, for each value of acceleration a (a') and dopper f (f') in the selected sets of acceleration and Doppler values, a phase value $\phi_i$ is computed for each segment i:

$$\phi_i = 2\pi\left(\frac{1}{2}a't_i^2 + f't_i\right)$$

At set 460, using the computed phase $\phi_i$, an ambiguity function, such as the sum of squares of the real and imaginary components of quadrature correlation function, is computed:

$$A(a', f') = \left[\sum_i (I_i\cos\phi_i + Q_i\sin\phi_i)\right]^2 + \left[\sum_i (-I_i\sin\phi_i + Q_i\cos\phi_i)\right]^2$$

The pair of acceleration value a' and Doppler value f' that yield the greatest ambiguity function is selected to be the predicted acceleration value and Doppler value, respectively, to be used in step 140 of FIG. 1.

The number of values of a' and f' to be selected at step 440 can be determined by, for example, the following procedure:
1. Define t as the spacing between segments and T as the total capture duration. (For example, if one divides the acquired signal into 8 segments, t would be 0.128 seconds for a capture duration T of 1.024 seconds);
2. For Doppler space (f), determine the number of values using a bin spacing of 0.25 cycles per captured duration, and search range of 1 cycle per segment spacing (e.g., using the t and T of the previous step, the bin value would be 0.24414 Hz, and the search range would be 7.8125 Hz, so that 32 values of Doppler f' would be used);
3. For the acceleration space (a), a bin spacing of 0.5 cycles per captured duration squared and search range of 1 cycle per segment spacing squared (e.g., using the t and T of the previous step, the bin value would be 0.47684 Hz/sec, and the search range would be 61.035 Hz/sec, so that 128 values of acceleration a' would be used).

Using the above procedure, for a captured duration of 1.024 ms, divided into 8 segments, 4096 pairs of (a',f') are used.

Once the best point acceleration a' and doppler f' values are identified at step 470 above, these estimate of a and f may be further refined. It should be recognized that the ambiguity function is highly correlated in a and f. For example, if the acceleration estimate is wrong by an amount $\Delta a$, the ambiguity function is maximized by a Doppler f that has an error of $$\Delta f = \frac{1}{2}\Delta aT.$$

One method to address this correlation between a and f is simply to refine the search for the peak of the ambiguity function by performing another grid search in the vicinity of the best point using a finer grid. For this finer grid, for example ⅛ spacing of the previous grid in both the a and f dimensions, a search can be conducted ranges in both the a and f dimensions that are each twice the coarse grid values.

Thus, the total number of probe points for this search in the fine grid search is thus 17×17=289. Alternately, we may use derivative-based maximization techniques along with a change of coordinates $$f = f - \frac{1}{2}\Delta aT.$$

In this case, the ambiguity function is maximized by searching over values of f and a. Because scanning the grid for f and a values may be computationally intensive when the number of segments is large, using eight segments may not be appropriate in instances. In general, however, the more segments used, the greater the sensitivity would be, at the expense of a longer "time-to-fix".

This detailed description is provided to illustrate the specific embodiments of the present invention described above, and is not intended to be limiting. Many modifications and variations are possible within the scope of the present invention. The present invention is set forth in the accompanying claims.

I claim:

1. A method for a location determination, comprising:
   Acquiring a first positioning signal;
   Using a parametric model based on phase values of the first positioning signal and a clock signal acceleration to provide an estimate of the clock signal acceleration;
   Acquiring additional positioning signals based on the estimate of the clock signal acceleration; and
   Performing the location determination using the first positioning signal and the additional positioning signal.

2. A method as in claim 1, wherein the additional positioning signals are acquired using a stacking technique.

3. A method as in claim 1, further comprising validating acquisition of the additional signals.

4. A method as in claim 1, wherein the first positioning signal is acquired based on a signal-to-noise ratio exceeding a predetermined threshold.

5. A method as in claim 1, wherein the estimate of the clock signal acceleration is provided using:
   dividing the first positioning signal into a plurality of segments;
   Estimating a phase value for a time point in each of the segments;
   Fitting the phase values into the parametric model; and
   Deriving the clock signal acceleration from the parametric model.

6. A method as in claim 5, wherein parametric model is based on a constant clock signal acceleration.

7. A method as in claim 5, wherein the parametric model comprises a parabolic function.

8. A method as in claim 7, the parabolic function comprises as variables the clock signal acceleration, an initial phase value and a clock Doppler.

9. A method as in claim 5, wherein each phase value of the segments is estimated based on phase values previously estimated.

10. A method as in claim 5, wherein each phase value is estimated based on a quadrature correlation function.

11. A system for location determination, comprising:
    A GPS receiver front-end integrated circuit that receives a GPS positioning signal and provides a digitized output signal representing the GPS positioning signal;
    A non-volatile storage device for storing instruction of a computer program;

A signal processing integrated circuit that receives the digitized output signal of the GPS receiver front-end integrated circuit, retrieves the software program from the non-volatile storage device arid executes the instructions to perform:

Acquiring a first positioning signal;

Using a parametric model based on phase values of the first positioning signal and a clock signal acceleration to provide an estimate of the clock signal acceleration;

Acquiring additional positioning signals based on the estimate of the clock signal acceleration; and Performing a location determination using the first positioning signal and the additional positioning signal.

12. A system as in claim 11, wherein the additional positioning signals are acquired using a stacking technique.

13. A system as in claim 11, the signal processing integrated circuit further performs validating acquisition of the additional signals.

14. A system as in claim 11, wherein the first positioning signal is acquired based on a signal-to-noise ratio exceeding a predetermined threshold.

15. A system as in claim 11, wherein the estimate of the clock signal acceleration is provided using:

Dividing the first positioning signal into a plurality of segments;

Estimating a phase value for a time point in each of the segments;

Fitting the phase values into the parametric model; and

Deriving the clock signal acceleration from the parametric model.

16. A system as in claim 15, wherein parametric model is based on a constant clock signal acceleration.

17. A system as in claim 15, wherein the parametric model comprises a parabolic function.

18. A system as in claim 17, the parabolic function comprises as variables the clock signal acceleration, an initial phase value and a clock Doppler.

19. A system as in claim 15, wherein each phase value of the segments is estimated based on phase values previously estimated.

20. A system as in claim 15, wherein each phase value is estimated based on a quadrature correlation function.

* * * * *